Dec. 17, 1957 T. L. FAWICK 2,816,626
PRESSURE FLUID BRAKING SYSTEM FOR TRACTOR-TRAILER VEHICLES
Filed June 3, 1954 2 Sheets-Sheet 1

INVENTOR.
THOMAS L. FAWICK
BY
ATTORNEY

Dec. 17, 1957     T. L. FAWICK     2,816,626
PRESSURE FLUID BRAKING SYSTEM FOR TRACTOR-TRAILER VEHICLES
Filed June 3, 1954     2 Sheets-Sheet 2

*INVENTOR.*
THOMAS L. FAWICK
*BY*
ATTORNEY

United States Patent Office 2,816,626
Patented Dec. 17, 1957

2,816,626

PRESSURE FLUID BRAKING SYSTEM FOR TRACTOR-TRAILER VEHICLES

Thomas L. Fawick, Cleveland, Ohio, assignor to Fawick Corporation, a corporation of Michigan Application June 3, 1954, Serial No. 434,306

3 Claims. (Cl. 188—3)

This invention relates to pressure-fluid braking systems for tractor-trailer vehicles.

Its chief objects are to provide an improved braking system such as to provide conveniently for parking of the trailer alone with its brakes set, the tractor being freed from it for service elsewhere; to provide for ease of operation in the setting of the trailer brakes and the disconnecting of the tractor; to provide those advantages in a hydraulic braking system with avoidance of loss of brake-fluid from the system; and to provide these advantages in a dual system comprising service braking means and emergency braking means each operable independently of the operation of the other.

Figure 1:
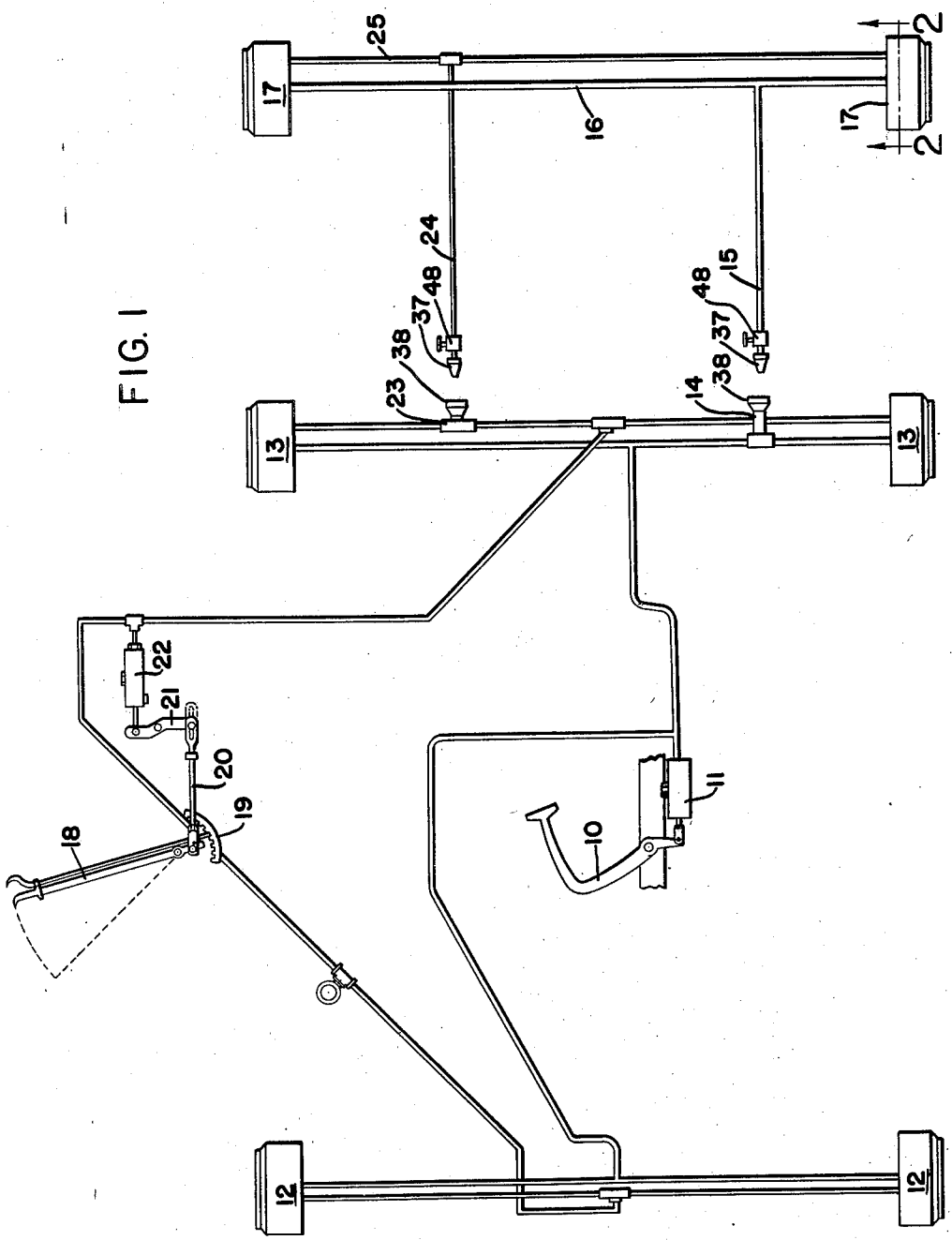
Fig. 1 is a diagram of a dual braking system embodying the invention in its preferred form.

Referring first to Fig. 1, the assembly comprises a preferably hydraulic service-brake system having a foot lever 10 for moving a piston in a cylinder 11 and thereby forcing brake fluid, through suitable piping as shown, to the front-wheel brakes 12, 12 and the rear-wheel brakes 13, 13 of the tractor and, through extensions 14, 15, 16, to the brakes 17, 17 of the trailer.

The assembly comprises also a hand-lever 18 having a ratchet 19 connected by a lost-motion link 20 and a lever 21 for moving a piston in a cylinder 22 and thus forcing brake fluid, through suitable piping as shown, to the four wheels of the tractor and, through extensions 23, 24, 25, to the brakes 17, 17 of the trailer.

Each of the brakes 12, 13 and 17 can be any known or suitable hydraulic brake but for the preferred embodiment here shown, having dual control, a desirable brake is the one that is described and claimed in Thomas L. Fawick application Ser. No. 216,560, filed March 20, 1951, now Patent 2,759,568, the pertinent features of that brake being shown also in Fig. 2 of this application.

The subject matter claimed in the present application is disclosed but not specifically claimed in the patent just mentioned and in Thomas L. Fawick application Ser. No. 209,788, filed February 7, 1951, now Patent 2,726,738.

In that brake a brake drum 26 surrounds and is adapted to be frictionally engaged by a circumferentially spaced set of hinged brake shoes such as the shoe 27. For dual actuation a cylinder 28, having two cylinder chambers, permissibly of different diameters, for respective pistons 29, 30, permissibly integral with each other, is provided for each shoe 27. The cylinder is mounted upon and permissibly integral with the torque plate 31. A passage 32 drilled in the torque plate leads from the pipe 16, Fig. 1, to the large-diameter part of the cylinder and a pipe 33 leads from the pipe 25 to the small-diameter part of the cylinder.

The fluid receiving spaces under the respective pistons being separated by a self-energizing O-ring 29a, the operation of each of the braking systems is independent of the operation of the other.

Figure 2:
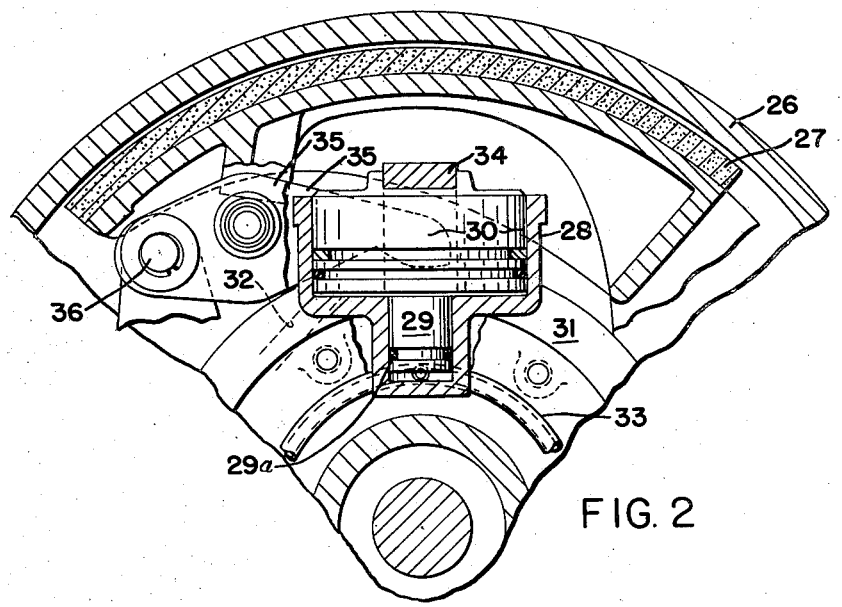
Fig. 2 is a fragmentary section on line 2—2 of Fig. 1.

The piston 30, Fig. 2, transmits the braking force to the shoe through a yoke 34 and a pair of levers 35, 35 which are fulcrumed at 36 upon a heel portion of an adjacent shoe. These levers have their outer ends engaged with laterally projecting lugs on the yoke 34, and have engagement with the shoe at their middle portions.

Figure 3:
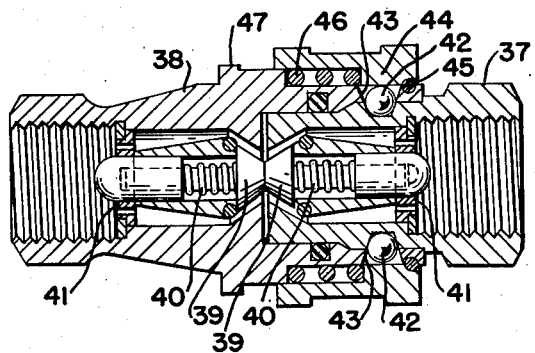
Fig. 3 is a longitudinal middle section of a non-bleeding hydraulic coupling of known design but constituting an important part of applicant's combination.

For coupling and uncoupling the pipe 23 with relation to the pipe 24, and the pipe 14 in relation to the pipe 15, a non-bleeding coupling, comprising a plug member 37 and a socket member 38 is provided in each instance. Each of these couplings preferably is of the type shown in Fig. 3.

As there shown, each coupling comprises, within the plug and socket members respectively, a pair of check-valves 39, 39 backed by respective springs 40, 40 seated upon respective spiders 41, 41, these check-valves being adapted to hold each other off from their valve-seats and thus permit free flow of fluid when the plug member 37 is fully seated in the socket member 38, but automatically to close against their respective seats as the plug is withdrawn from the socket.

The means for holding the plug and socket in mated relation obviously can be varied, but the particular means here shown comprises a set of locking balls 42, 42 mounted in respective tapered holes 43, 43 through the wall of the socket member and extending into an annular taper groove in the outer face of the plug when they are held inward by a sleeve 44 slidably mounted upon the socket member 38 and retained thereon by a snap-ring 45. A compression spring 46 is mounted between an external shoulder on the socket and an internal shoulder of the sleeve for holding the sleeve in ball-locking position but is adapted to be overcome in the sliding of the sleeve into contact with a stop-shoulder 47 on the socket, to permit the balls to be moved outward by the taper wall of the plug's groove, for release of the interlock, as the plug is withdrawn from the socket while the sleeve is held in its ball releasing position against the shoulder 47.

Full escape of the balls is prevented, at such times, by the snap-ring 45 and the adjacent annular corner of the sleeve, spaced apart less than the balls' diameter, although spaced sufficiently to permit release of the plug by the balls.

The hand lever 18 and its ratchet 19 provide for setting of the brakes, as for parking, but if the trailer only is to be parked, with its brakes set, this of course requires the uncoupling of the plug-and-socket, non-bleeding couplings 37—38, 37—38. The high pressure in the one of the non-bleeding couplings that connects the pipes 23, 24, resulting from the setting of the brakes by the hand lever and ratchet, causes the locking balls to bind strongly against the sleeve 44 and thus makes it impractical to disconnect the coupling while the internal pressure is maintained within the coupling.

This problem is of course not peculiar to this particular type of non-bleeding coupling.

For solution of this problem, a shut-off valve 48 is interposed in the pipe-line 24 between the non-bleeding coupling 37—38 and the trailer brakes 17, and preferably close to the said coupling, for accessibility.

A like shut-off valve 48 preferably is interposed in the pipe-line 15 of the foot-operated brake system, for prevention of a large loss of brake fluid upon failure of the adjacent non-bleeding coupling, and also to permit, on occasion, parking of the trailer with its brakes set under the force of either or both of the service system and the emergency system, by procedure hereinafter described.

The structure as described is such that, if the trailer only is to be parked by a single operator, he can set all brakes by means of the hand lever 18, then close the shut-off valve 48 of that piping system, then release the hand lever to relieve the pressure in the coupling while the trailer brakes 17 continue to be in set condition under the force of the brake fluid back of the shut-off valve. With the pressure in the coupling thus relieved he can easily disconnect it, and then free the tractor from the parked trailer by disconnecting the other coupling and the mechanical drive connection, not shown, of the two vehicles.

With the assistance of another operator to vary pressure upon the foot-lever 10 appropriately, he can, by closing the shut-off valve 48 of that system, leave the trailer parked with pressure in the line 15 applied to hold the trailer brakes set, whether or not pressure in the line 24 continues to be so applied.

Variations are possible without departure from the scope of the invention as defined in the appended claims.

I claim:

1. A braking system for a tractor-trailer vehicle assembly, said system comprising a fluid-actuated brake on the trailer, a pressure-fluid line on the trailer for acuating said brake, a pressure-fluid line on the tractor and leading to the first mentioned line for communication therewith, quick-detachable fluid-coupling means for connecting and disconnecting said lines, means on the tractor for applying pressure to fluid in said lines and for releasing the pressure therein, means for locking the said pressure-applying means and releasing in its pressure-applying condition and for changing it to its pressure-releasing condition, and a shut-off valve interposed in the first mentioned pressure-fluid line, between the said fluid-coupling means and the trailer brake.

2. A system as defined in claim 1, said system being a hydraulic-brake system, and the defined coupling being of the non-bleeding type.

3. A braking system for a tractor-trailer assembly, said system comprising a fluid-actuated brake on the trailer, a pressure-fluid line on the trailer for actuating said brake, a pressure-fluid line on the tractor and leading to the first mentioned line for communication therewith, quick-detachable fluid-coupling means for connecting and disconnecting said lines, a fluid-impelling member on the tractor for applying pressure to fluid in said lines and for releasing the pressure therein, means for releasably locking said member in its pressure-applying position, and a shut-off valve interposed in the first mentioned line, between the said fluid-coupling means and the trailer brake.

References Cited in the file of this patent

UNITED STATES PATENTS

| | | |
|---|---|---|
| 1,456,014 | Stevenson | May 22, 1923 |
| 1,986,799 | Dickey | Jan. 8, 1935 |
| 1,987,435 | Engel | Jan. 8, 1935 |
| 2,120,677 | Oliver | June 14, 1938 |
| 2,335,825 | Eaton et al. | Nov. 30, 1943 |
| 2,578,388 | Ambler | Dec. 11, 1951 |
| 2,726,738 | Fawick | Dec. 13, 1955 |